United States Patent
Hasegawa

(12) 
(10) Patent No.: US 6,877,856 B1
(45) Date of Patent: Apr. 12, 2005

(54) SPECTACLES FOR PRESBYOPIA

(76) Inventor: Masahiro Hasegawa, 602, Morisu Keionagayama, 16-3, Kaitori 1-chome, Tama-shi, Tokyo, 206-0012 (JP)

( * ) Notice: Subject to any disclaimer, the term of this patent is extended or adjusted under 35 U.S.C. 154(b) by 0 days.

(21) Appl. No.: 10/726,635

(22) Filed: Dec. 4, 2003

(51) Int. Cl.[7] .................................................. G02C 1/00
(52) U.S. Cl. ......................................... 351/158; 351/41
(58) Field of Search ............................ 351/41, 158, 62, 351/175, 176

(56) References Cited

U.S. PATENT DOCUMENTS 6,257,719 B1 * 7/2001 Pavlak ......................... 351/62

* cited by examiner

*Primary Examiner*—Hung Xuan Dang
(74) *Attorney, Agent, or Firm*—Varndell & Varndell PLLC

(57) ABSTRACT

Spectacles for presbyopia including right and left spectacle lenses for correcting presbyopia through which a user with both presbyopia and astigmatism against the rule can see objects in a near range clearly, a frame for supporting the right and left spectacle lenses, right and left side pieces journalled to right and left sides of the frame. The frame has an elongated upper frame beam extending horizontally over the right and left spectacle lenses, and an elongated beam-like member is provided on the frame such that an elongated slit extending horizontally over the right and left spectacle lenses is formed by an upper surface of the upper frame beam and a lower surface of the elongated beam-like member.

3 Claims, 7 Drawing Sheets

SPECTACLES FOR PRESBYOPIA

BACKGROUND OF THE INVENTION

1. Field of the Invention

The present invention relates to spectacles for presbyopia by means of which a user can see objects not only in near range, but also in a middle to far range, and more particularly relates to spectacles for presbyopia, with which a person having both presbyopia and astigmatism against rule can clearly see objects in a middle to far range during a time in which the person looks at objects in near range through presbyopia correcting lenses.

2. Related Art Statement

First of all, the principal matters of ophthalmology will be explained. An adjusting power of eyes, i.e. eyesight for seeing objects at a visualization distance of 25–30 cm is generally 3–4 D (diopters), but this eyesight is gradually decreased in accordance with aging and aged persons could not see objects in a near range clearly. Such a situation of eyes is called presbyopia. In general, the presbyopia appears after forty five years old at which eyesight has decreased to 2–4 D.

A nearsighted person can see objects in a near range rather clearly, and therefore although his or her adjusting power of eyes is decreased due to aging, he or she can see objects in a near range rather clearly by reducing a degree of shortsightedness of spectacles or putting off the spectacles or using week convex lens or lenses.

However, when eyesight of a normal-sighted or far-sighted person is decreased due to aging, the adjusting power of eyes for seeing objects in a near range must be corrected by spectacles including convex eyeglass lenses. Such spectacles are called spectacles for presbyopia or far-sighted glasses.

Astigmatism is such a refracting condition of an eye that a light ray emitted from a point outside the eye is not focussed at a point within the eye or even outside the eye. In a regular astigmatism, a vertical meridian and a horizontal meridian cross each other at right angles, and a focal line of the vertical meridian and a focal line of the horizontal meridian are shifted back and for along an optical axis. The regular astigmatism may be classified into astigmatism with the rule in which the strongest main meridian is vertical and astigmatism against the rule in which the strongest meridian is horizontal. Strictly speaking, almost all eyes have the astigmatism to a certain extent.

As stated above, eyesight is gradually decreased in accordance with aging and a degree of presbyopia increases, and at the same time, the astigmatism against the rule is liable to increase in accordance with aging. This is due to the fact that a curvature of a vertical meridian of a cornia becomes smaller to reduce the astigmatism with the rule, and the astigmatism of a crystal lens which has a tendency of the astigmatism against the rule is increased (Ophthalmologic Book, No. 29, "Old man and Eyes", page 7). According to "Refracting Abnormality and Correction for the Same (Revised Edition 3)", published by Kinbara Publisher, page 136, 66.9% of persons of sixty to eighty years old have the astigmatism against the rule.

FIG. 15 is a schematic view showing the astigmatism against the rule. The astigmatism against the rule is a kind of the regular astigmatism, and thus the horizontal meridian crosses the vertical meridian at right angles. In the astigmatism against the rule, the horizontal meridian has a strong refraction power (strong main meridian), and a light ray emitting from a point at infinity is focused at a front focal line and the vertical meridian has a weak refracting power (weak main meridian) and a light ray from a point at infinity is focused at a back focal line.

When eyesight is decreased due to aging, eyes generally become far-sighted, and in the astigmatism against the rule, the front focal line is much closer to a retina than the back focal line. A range between the front focal line and the back focal line is called a focal range or focal depth which represents a degree of the astigmatism. A portion of the focal range slightly closer to the front focal line is called a circle of least confusion.

Usually, a person with the astigmatism sees objects such that eyes are focused at the circle of least confusion. If the person has a sufficiently strong focus adjusting power, either one of the front focal line and back focal line which causes less fatigue to eyes is focused on a retina, and an object can be seen clearly.

In case of the astigmatism against the rule of aged or old persons, the presbyopia becomes dominant and a degree of the astigmatism against the rule is increased in accordance with aging. Then, the focal range becomes larger. When objects are seen with naked eyes, the circle of least confusion on which object images are focused is far away from retina. Since eyesight is decreased, it is no more possible to focus a front focal line on retina, and thus vague images of objects in a middle to far range are formed on retina.

Aged persons usually have both the presbyopia and the astigmatism against the rule, and there have been developed spectacles having combination lens of convex lenses for correcting near-sightedness and cylindrical lenses for correcting the astigmatism against the rule. Such spectacles are very useful for seeing objects in a near range as well as objects in a middle to far range. However, upon assembling and accommodating such spectacles, a precise measurement of the astigmatism of a user has to be carried out several times, and therefore such spectacles are generally very expensive. Furthermore, it is rather difficult to attain correct accommodation, and sometimes problems of overcorrection and distortion might occur.

When an aged person wearing spectacles for presbyopia is looking objects in a near range, he or she often wants to see objects in a middle to far range over his or her far-sighted glasses. Since almost all aged persons have the astigmatism against the rule, when they see objects in a middle to far range with naked eyes, it is difficult to see clear images of the objects. However, since such a situation could not affect the daily life seriously, aged persons do not feel inconvenience so much.

However, aged persons sometimes wish to look at objects in a middle and far range over spectacles for presbyopia much more clearly. For instance, aged persons often want to see detail appearance of faces of grandchildren just coming home, relatively small characters in TV screens, and birds and flowers outside windows.

SUMMARY OF THE INVENTION

The present invention has for its object to provide spectacles for presbyopia, which can overcome the above mentioned problem, can correct the astigmatism against the rule due to far-sightedness, can see clearly objects in a middle to far range, and can be light in weight and cheap in cost.

According to a basic conception of the invention, spectacles for presbyopia comprises:

right and left spectacle lenses for correcting presbyopia;

right and left side pieces for holding the right and left spectacle lenses in front of right and left eyes of a user, respectively; and at least one slit provided above the right and left spectacle lenses to extend horizontally over the right and left spectacle lenses.

According to another aspect of the invention, spectacles for presbyopia comprises:

right and left spectacle lenses for correcting presbyopia;

a frame for supporting said right and left spectacle lenses;

right and left side pieces journalled to right and left sides of said frame, respectively for holding the right and left spectacle lenses in front of right and left eyes of a user, respectively; and at least one elongated slit provided on said frame to extend horizontally over said right and left spectacle lenses.

According to further aspect of the invention, spectacles for presbyopia comprises:

right and left spectacle lenses;

a frame including right and left lens supporting members for supporting said right and left spectacle lenses, respectively and including right and left frame beams, right and left nose pads provided on inner sides of said right and left lens supporting members, and a bridge member for coupling said right and left lens supporting members with each other;

right and left side pieces having one ends journalled to outer sides of said right and left lens supporting members, respectively; and right and left slits provided on said frame beams to extend horizontally over said right and left spectacle lenses, respectively.

DESCRIPTION OF THE PREFERRED EMBODIMENTS

Figure 1:
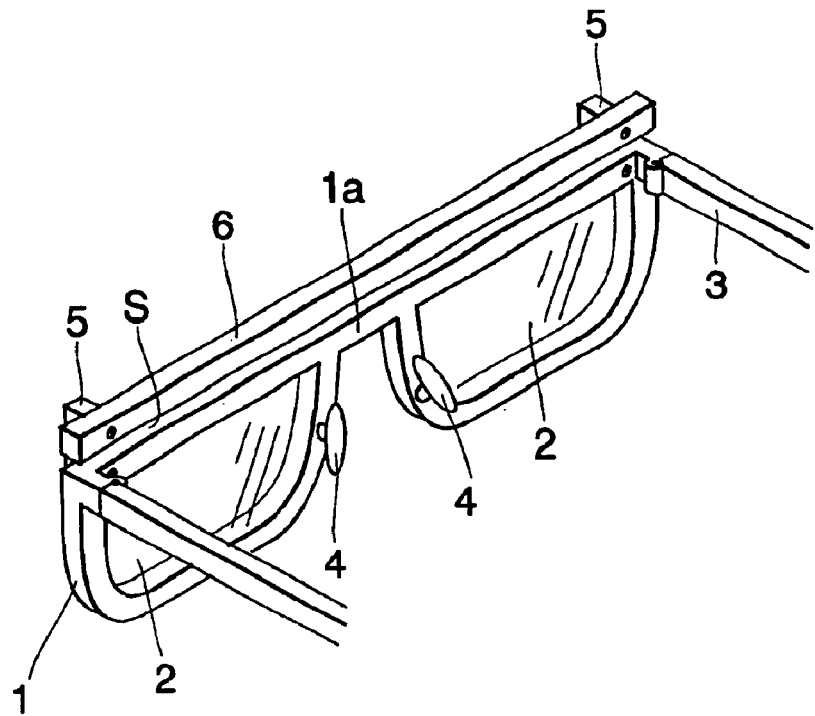
FIG. 1 is a perspective view a first embodiment of the spectacles for presbyopia according to the invention.

FIG. 1 is a perspective view showing a first embodiment of the spectacles for presbyopia according to the invention. The spectacles for presbyopia comprises a frame 1 including a main body for supporting right and left far-sighted spectacle glasses 2 each formed by a convex lens and nose pads 4 provided on inner sides of the main body. The spectacles further includes right and left side pieces 3 having one ends swingably secured to right and left upper end corners of the main body. In the present embodiment, the main body of the frame 1 comprises an upper frame beam 1a having a flat upper face which extends horizontally over the right and left eyeglass lenses 2. Above the upper frame beam 1a is arranged a beam-like member 8, which is secured to the upper frame beam 1a by means of connecting members 5 such that a slit S having a given distance is formed between the upper frame beam 1a and the beam-like member 5. In the first embodiment, the elongated slit S extending over the right and left eyeglass lenses 2 is formed by the flat upper end face of the upper frame beam 1a and the flat lower end face of the beam-like member 6. It should be noted that the slit S may be formed by an elongated opening formed in the upper frame beam 1a. In such a case, it is no more necessary to provide the upper beam-like member 6 and connecting members 5.

Figure 2:
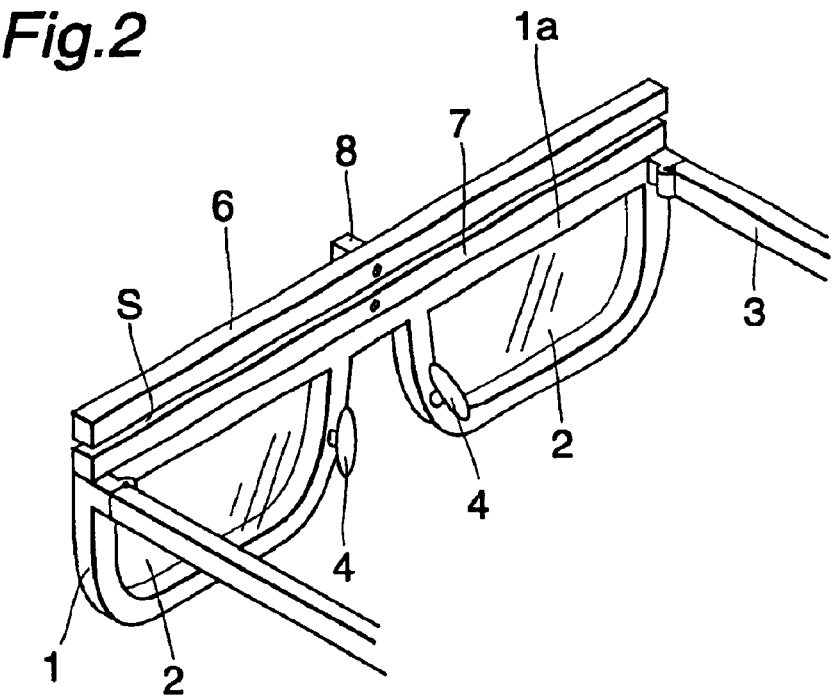
FIG. 2 is a perspective view illustrating a modification of the first embodiment of the spectacles for presbyopia according to the invention.

FIG. 2 is a perspective view illustrating a modification of the first embodiment of the spectacles according to the invention. In the first embodiment shown in FIG. 1, the slit S is formed by utilizing the upper frame beam 1a of the frame member 1. In the modified embodiment depicted in FIG. 2, the slit S is formed by first and second beam-like members 6 and 7 which are secured to a middle of the upper frame beam 1a by means of a connecting member 8. In this modified embodiment, the elongated slit S is divided into right and left slits by means of the connecting member 8 situating at a middle of the right and left eyeglass lenses 2, but a user does not feel any inconvenience.

According to the invention, slit constituting members such as the frame member 1 and beam-like members 6 and 7 are preferably made of an opaque material which does not transmit light in order to enhance the function of the slit S.

When a person wearing the spectacles for presbyopia according to the invention sees objects in a middle to far range through the slit S provided above the frame member 1a of the spectacles, he or she can see the objects clearly. It should be noted that the slit S has a field of view whose size in a vertical direction is small, but this demerit is not so serious owing to a reason that the use of the slit S is restricted to a case in which a person wearing the spectacles wants to see objects in a middle to far range, while he or she is looking at objects in a near range through the far-sighted eyeglass lenses 2 of the spectacles. According to the invention, the spectacles can be small in size, light in weight, simple to use and less expensive in cost, and there merits are superior to the above mentioned demerit.

Figure 3:
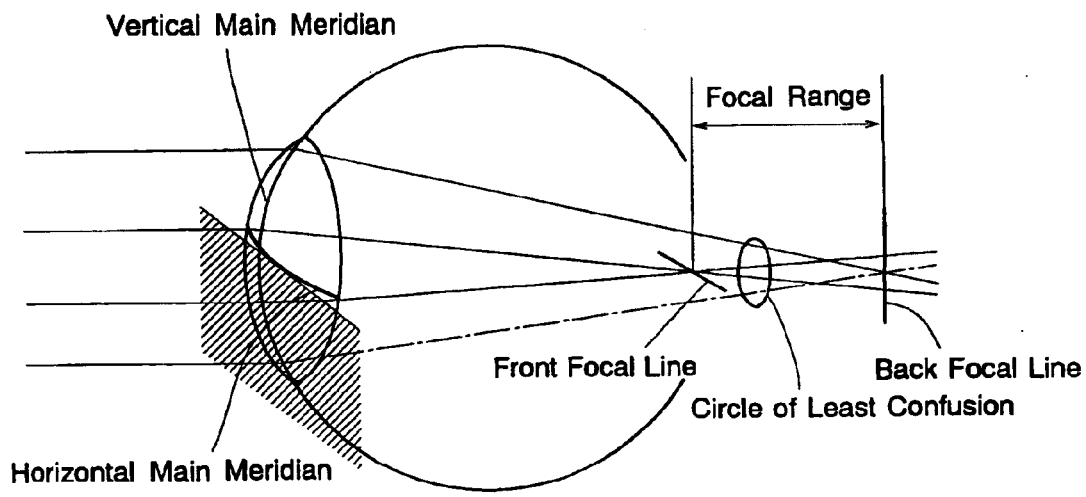
FIG. 3 is a schematic view representing the principle of the present invention

Now a reason why the slit S can correct the astigmatism against the rule will be explained. When an opaque plate-like member is moved upwardly from the bottom in front of eyes with the astigmatism against the rule of a person looking at an object until an upper edge of the plate-like member is placed just at a lower edge of the object such that a lower half of a field of view is shielded as illustrated in FIG. 3, the object situating above the upper edge of the plate-like member can be seen much more clearly. This is due to a fact that a lens function of a lower half of the vertical meridian (week main focal line) is suppressed, but a lens function of the horizontal meridian (strong focal line) is enhanced just above the upper edge of the plate-like member, and therefore a focused image of the object is formed at the front focal line. It should be noted that a front focal lime of a presbyopic eye with the astigmatism against the rule is closer to a retina, and thus the object can seen much more clearly.

Similarly when the plate-like member is moved downwardly in front of the eyes with the astigmatism against the rule until a lower edge of the plate-like member is coincided with an upper edge of the object, a portion of the object just below the lower edge of the plate-like member can be seen clearly due to the same reason as that explained above.

In this manner, when an aged person with the astigmatism against the rule sees an object through the slit S, a light flux which is less influenced by the vertical meridian (week main meridian) but is dominantly influenced by the horizontal meridian (strong main meridian) forms a focused image of the object on the front focal line. Since the front focal line is closer to a retina, the aged person can see the object much more clearly.

Figure 4:
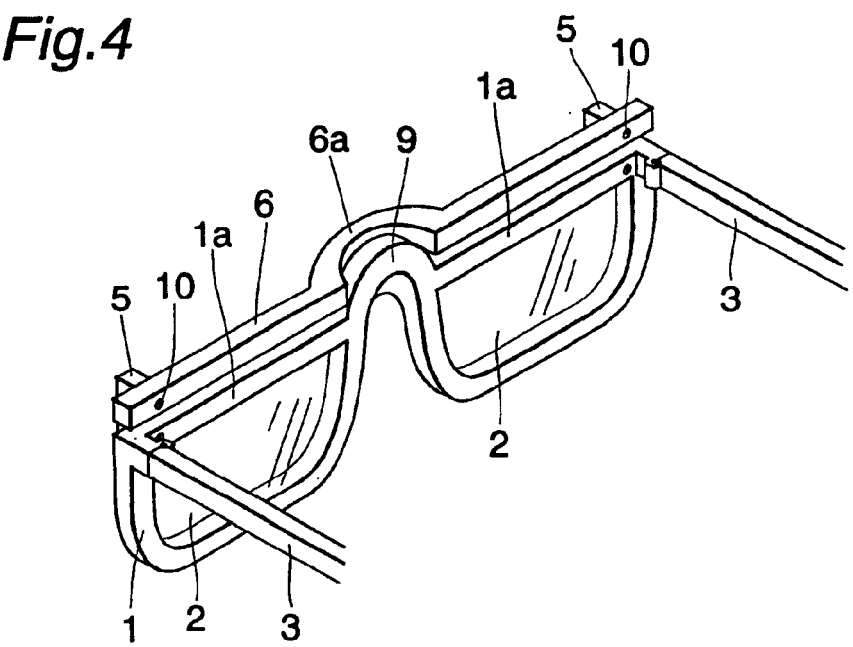
FIG. 4 is a perspective view depicting a second embodiment of the spectacles for presbyopia according to the invention.

FIG. 4 is a perspective view showing a second embodiment of the spectacles for presbyopia according to the invention. In the present embodiment, portions similar to those of the first embodiment are denoted by the same reference numerals used in FIGS. 1 and 2. In the present embodiment, an upper frame beam $1a$ has a vertically projected bridge portion 9 at a middle thereof, and a beam-like member 6 has a forwardly projected portion $6a$ such that the forwardly projected portion detours the vertically projected bridge portion 9 of the upper frame beam $1a$. Connecting members 5 are secured to the upper frame beam $1a$, and the beam-like member 6 is secured to the connecting members 5 by means of small screws 10 such that a slit S having a desired distance can be formed by the upper flat surface of the upper frame beam $1a$ and a lower flat surface of the beam-like member 6. For instance, a distance of the slit S may be set to a value within a range from 2 mm to 6 mm.

Figure 5:
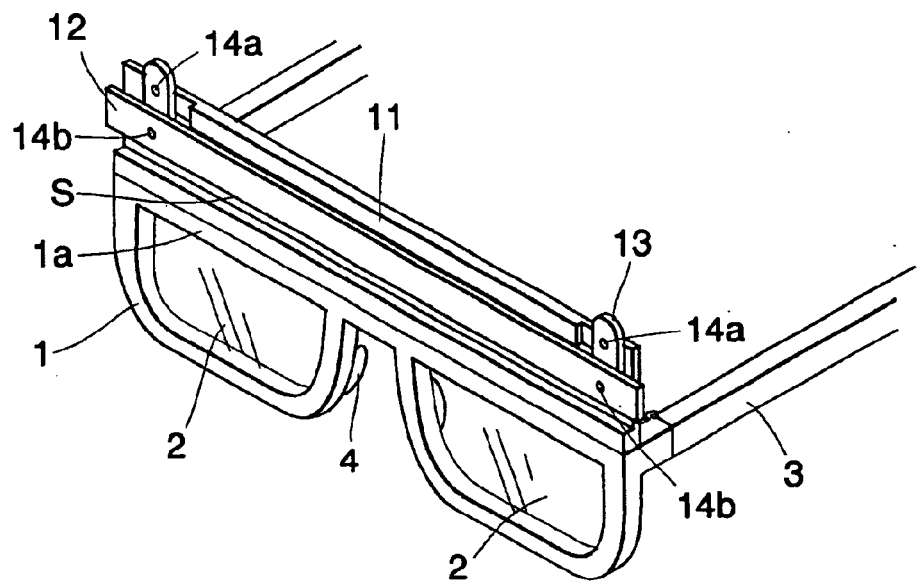
FIG. 5 is a perspective view showing a third embodiment of the spectacles for presbyopia according to the invention.
Figure 6:
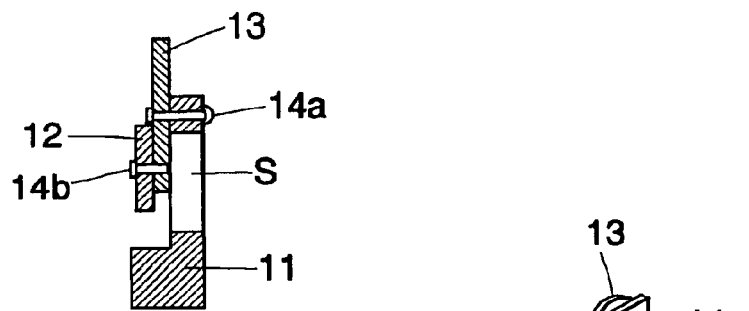
FIG. 6 is a cross sectional view illustrating a slit structure of the third embodiment.

FIGS. 5 and 6 are perspective and cross sectional views, respectively showing a third embodiment of the presbyopic spectacles according to the invention. In the present embodiment, a distance of the slit S can be easily changed by a user. A slit frame 11 having a rectangular elongated opening is secured on an upper surface of an upper frame beam $1a$ of eyeglass frame 1 and an elongated slit adjusting plate 12 is provided on the slit frame such that the slit adjusting plate 12 can move right and left as well as up and down while the plate 12 is always in parallel with the slit frame 11. That is to say, upper portions of connecting members 13 are journalled to the slit frame 11 by means of pins $14a$ and lower portions of the connecting members 13 are journalled to slit adjusting plate 12 by means of pins $14b$. In this manner, the slit frame 11, slit adjusting plate 12 and connecting members 13 constitute a parallel link mechanism.

Figure 7:
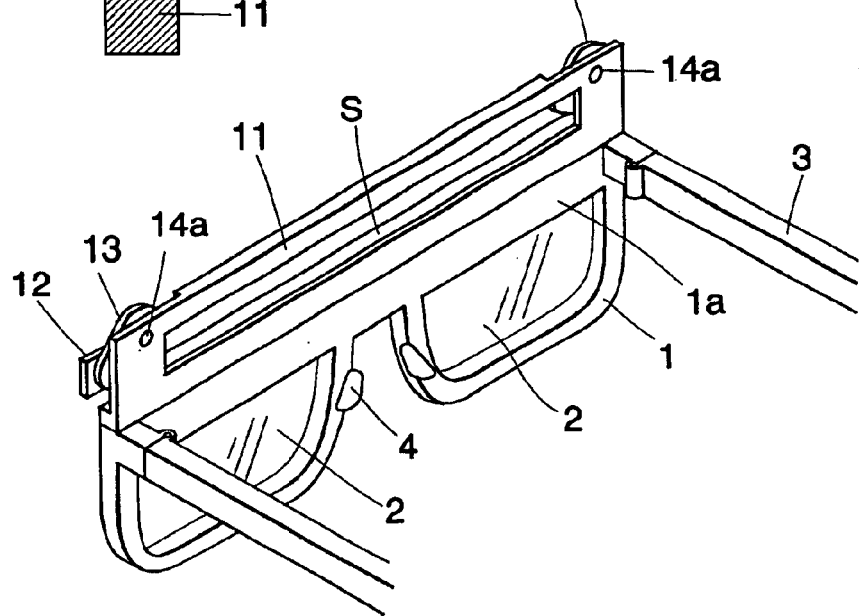
FIG. 7 is a perspective view representing a function of the third embodiment.

When the connecting members 13 are rotated as depicted in FIG. 7, the slit adjusting plate 12 is moved leftward or rightward as well as upward or downward and a distance of the slit S can be adjusted. It should be noted that the slit adjusting plate 12 is journalled such that the slit adjusting plate 12 can be kept in an inclined position. In this manner, a distance of the slit S can be adjusted within a range from 2 mm to 6 mm.

Figure 8:
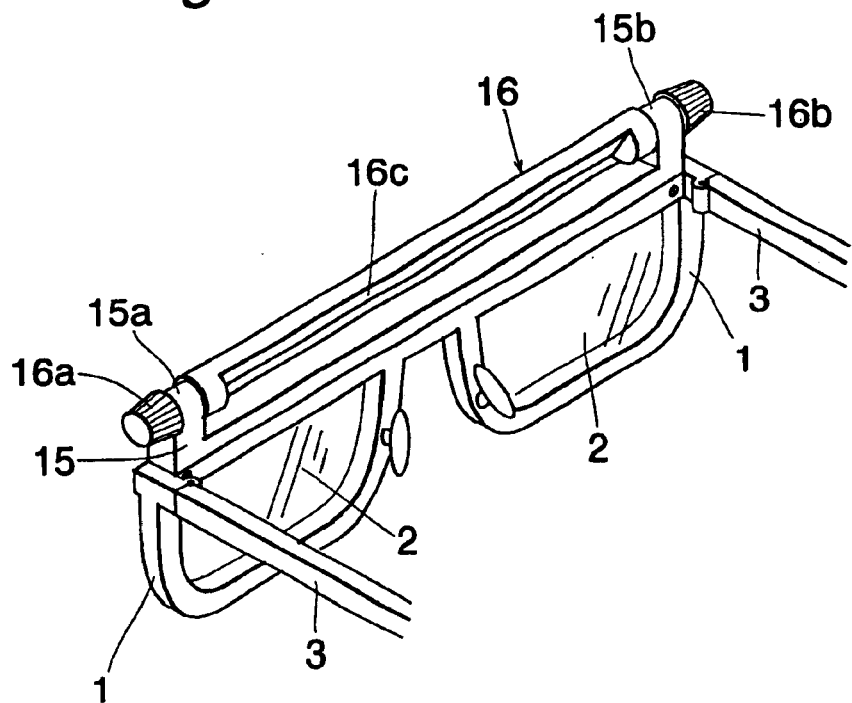
FIG. 8 is a perspective view depicting a fourth embodiment of the spectacles for presbyopia according to the invention.

FIG. 8 is a perspective view illustrating a fourth embodiment of the spectacles for presbyopia according to the invention. A slit frame 15 is secured on an upper face of an upper frame beam of an eyeglass frame 1. The slit frame 15 includes right and left projections $15a$ and $15b$, and an elongated rotatable member 16 is rotatably supported by the right and left projections $15a$ and $15b$ such that the rotatable member 16 can be rotated by rotating small knobs $16a$ and $16b$.

The rotatable member 16 has a substantially semicircular cross section except for both end portions thereof to constitute a slit defining face $16c$. By rotating the knobs $16a$ and $16b$, the rotatable member 16 is rotated and a distance of a slit S defined by an upper surface of the slit frame 15 and a lower edge of the slit defining face $16c$ is changed. Also in the present embodiment, a distance of the slit S can be adjusted within a range from 2 mm to 7 mm.

In the third and fourth embodiments shown in FIGS. 5–8, a distance of the slit S may be adjusted, and when a distance is large, the correction of the astigmatism against the rule is performed only at a region immediately below the upper edge of the slit and a region immediately above the lower edge of the slit, but a central region is seen without correcting the astigmatism against the rule. It is sometimes desired to see objects with a wide field of view to concept a whole sight, and when it is required to see an object within the wide field of view much more clearly, it is sufficient to move a head such that the object just comes closer to the upper or lower edge of the slit S. In this manner, the embodiments of the presbyopic spectacles with a variable slit distance according to the invention are suitable for watching large size TV screens and movie screens. Particularly, such spectacles with a variable slit distance are useful for watching superimposed film programs on TV screens and movie screens.

Figure 9:
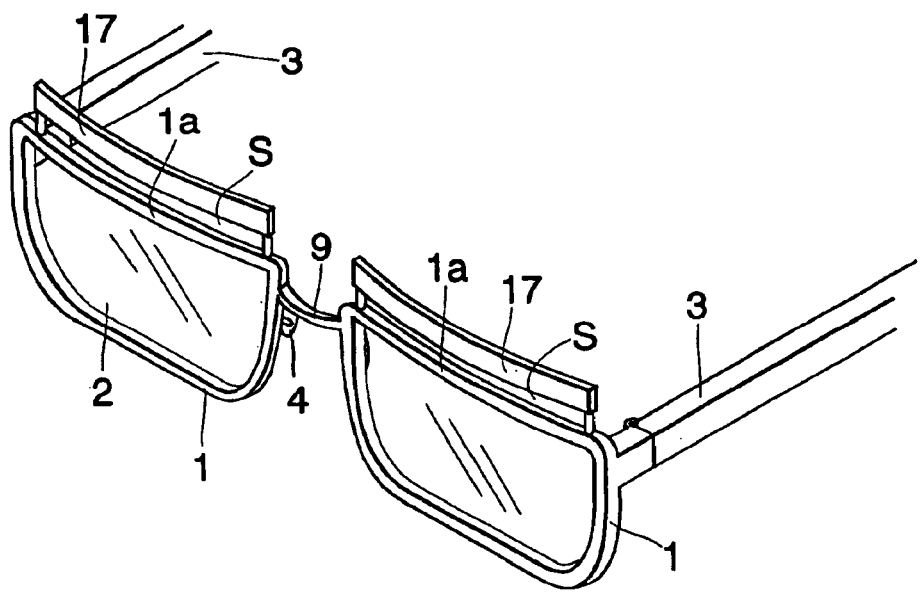
FIG. 9 is a perspective view illustrating a fifth embodiment of the spectacles for presbyopia according to the invention.

FIG. 9 is a perspective view showing a fifth embodiment of the spectacles for presbyopia according to the invention. In the embodiments so far explained, there is provided the elongated slit S extending over the right and left eyeglass lenses. In the present embodiment, there are provided right and left slits above the right and left eyeglass lenses, respectively. A frame 1 comprises right and left lens supporting portions for supporting right and left presbyopic eyeglass lenses 2, respectively, a bridge portion 9 for connecting the right and left supporting portions with each other, and right and left nose pads 4 provided on inner sides of the right and left supporting portions, respectively. The right and left supporting portions have upper portions $1a$ having flat upper surfaces. On the upper portions $1a$ are provided upper slit members 17 such that right and left slits S are formed between the upper portions $1a$ of the frame member 1 and the upper slit members 17. It should be noted that the upper portions $1a$ of the frame 1 is slightly curved outwardly, and the upper slit members 17 are also curved outwardly.

Figure 10:
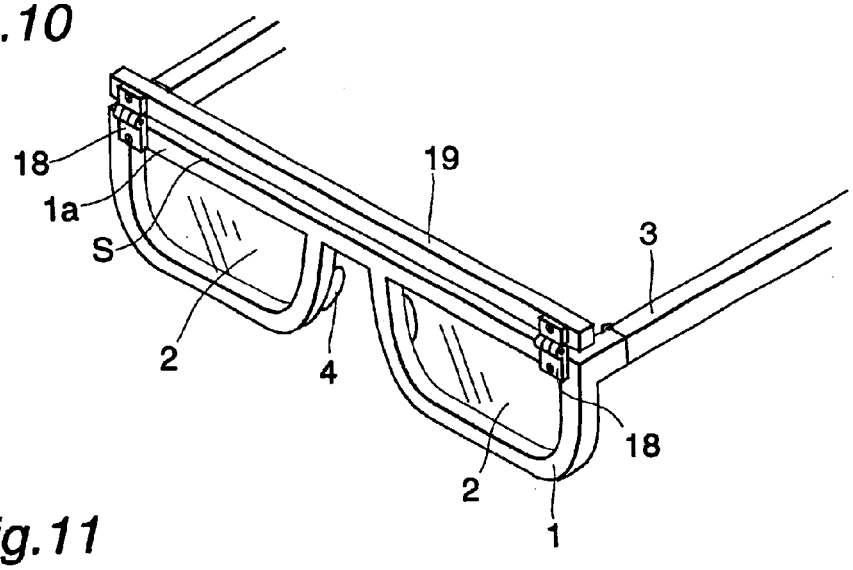
FIG. 10 is a perspective view showing a sixth embodiment of the spectacles for presbyopia according to the invention.

FIG. 10 is a perspective view showing a sixth embodiment of the spectacles for presbyopia according to the invention. In the present embodiment, an elongated beam-like member 19 is rotatably secured to an upper frame beam $1a$ of a frame 1 at its both ends by means of hinges 18. When the beam-like member 17 is placed above the upper frame beam 1*a* as illustrated in FIG. 10, a slit S is formed by the upper surface of the upper frame beam 1*a* and a lower surface of the frame-like member 19. When the slit S is not used, the beam-like member 19 may be folded on a front surface of the frame beam 1*a* to attain a compact configuration.

Figure 11:
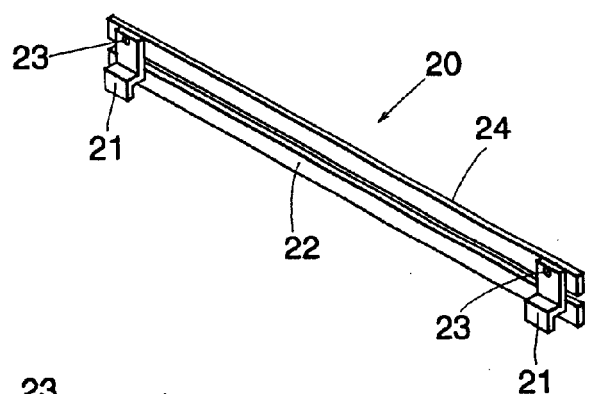
FIG. 11 is a perspective view depicting a slit structure of the seventh embodiment shown in FIG. 12.

FIG. 11 is a perspective view depicting a slit unit 20 of a seventh embodiment of the spectacles for presbyopia according to the invention. A slit S is formed by a lower beam-like member 22 and an upper beam-like member 24 and the upper beam-like member 22 is secured to fitting members 21 by means of small screws 23, said fitting members 21 being secured to the lower beam-like member 22.

Figure 12:
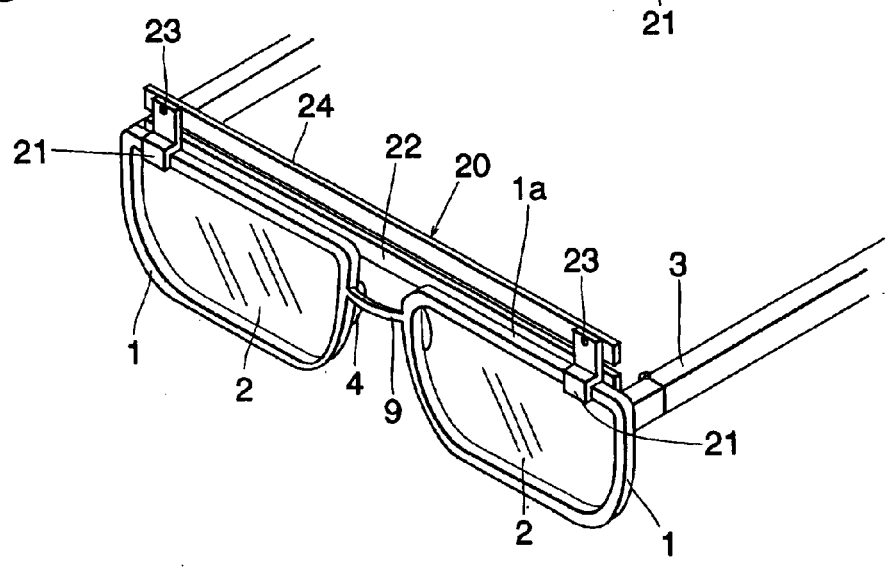
FIG. 12 is a perspective view illustrating a seventh embodiment of the spectacles for presbyopia according to the invention.

The slit unit 20 shown in FIG. 11 is detachably mounted on a frame 1 of presbyopic spectacles such that the fitting members 21 are placed on an upper frame beams 1*a* as illustrated in FIG. 12. It should be noted that if the slit unit 20 can be mounted on existing spectacles for presbyopia, it is sufficient for a user to buy only the slit unit 20.

Figure 13:
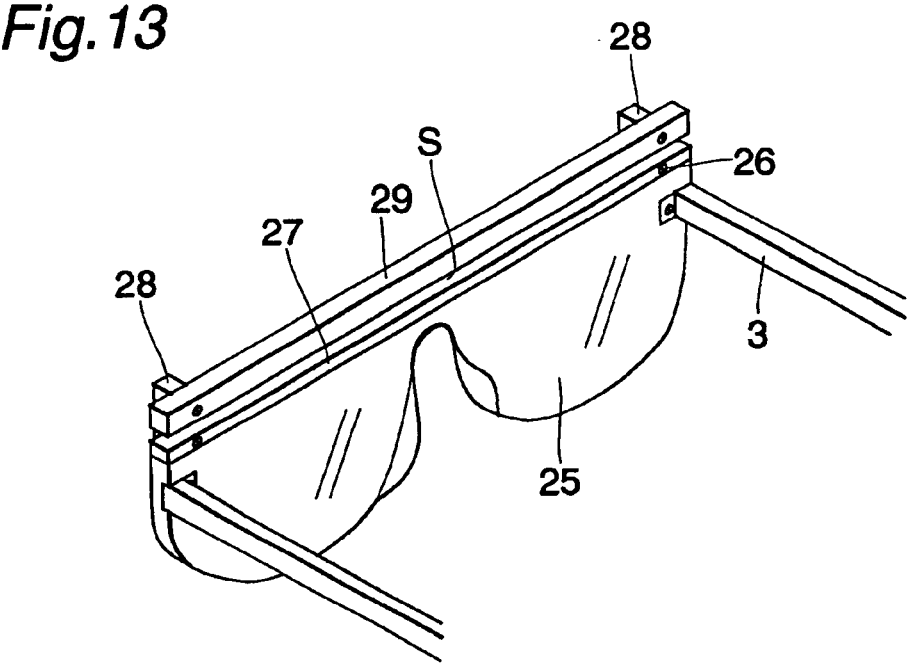
FIG. 13 is a perspective view showing an eight embodiment of the spectacles for presbyopia according to the invention.

FIG. 13 is a perspective view showing an eighth embodiment of the spectacles for presbyopia according to the invention. In the present embodiment, a main body 25 of the spectacles including right and left eyeglass lenses, a frame and nose pads is formed by a single integral body of a plastic material, and right and left side pieces 3 are journalled to right and left sides of the spectacles main body 25. Lower and upper elongated beam-like members 27 and 29 are secured to an upper edge of the main body 25 by means of connecting members 28 such that a slit S is defined between an upper surface of the lower beam-like member 27 and a lower surface of the upper beam-like member 29. By changing a securing position of the upper beam-like member 29 with respect to the connecting members 28, a distance of the slit S can be changed.

Figure 14:
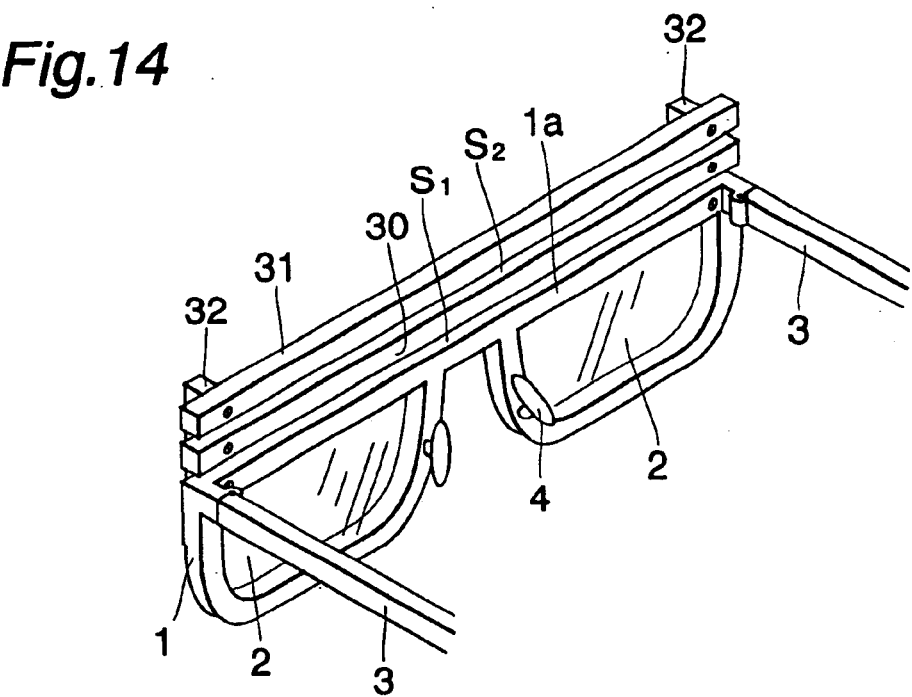
FIG. 14 is a perspective view depicting a ninth embodiment of the spectacles for presbyopia according to the invention.
Figure 15:
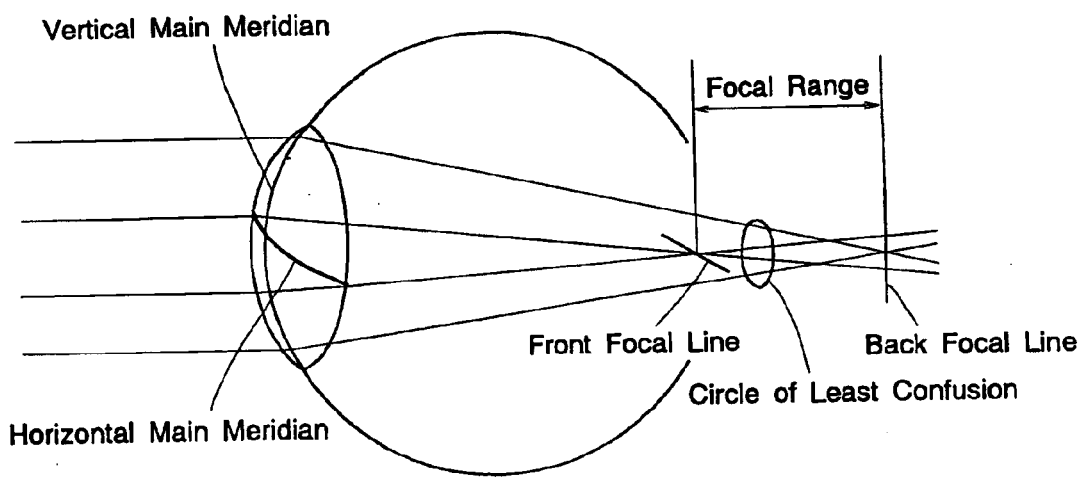
FIG. 15 is a schematic view representing astigmatism against the rule.

FIG. 14 is a perspective view depicting a ninth embodiment of the spectacles for presbyopia according to the present invention. On a frame beam 1*a* are provided two elongated beam-like members 30 and 31 by means of connecting members 32 such that a first slit $S_1$ is defined by an upper surface of the frame beam 1*a* and a lower surface of the lower beam-like member 30 and at the same time a second slit $S_2$ is defined by an upper surface of the lower beam-like member 30 and a lower surface of the upper beam-like member 31. By providing the two slits $S_1$ and $S_2$, a field of view is expanded up and down to a certain extent. In the present embodiment, distances of the first and second slits $S_1$ and $S_2$ are identical with each other, but according to the invention, these slits $S_1$ and $S_2$ may have different distances. Furthermore, according to the invention, more than two slits may be provided.

As explained above, in the spectacles for presbyopia according to the invention, the single slit is provided to extend horizontally over the right and left eyeglass lenses or the right and left slits are provided above the right and left eyeglass lenses, respectively, and since the slit can correct the astigmatism against the rule, a user can see an object in a middle to far range clearly through the slit or slits, while he or she is watching objects in a near range through the presbyopic eyeglass lenses.

What is claimed is:

1. Spectacles for presbyopia comprising:

right and left spectacle lenses for correcting presbyopia;

right and left side pieces for holding the right and left spectacle lenses in front of right and left eves of a user, respectively; and at least one slit provided above the right and left spectacle lenses extending horizontally over the right and left spectacle lenses, and a distance of said at least one slit is adjustable.

2. Spectacles for presbyopia comprising:

right and left spectacle lenses for correcting presbyopia;

a frame for supporting said right and left spectacle lenses;

right and left side nieces respectively pivoted to right and left sides of said frame for holding the right and left spectacle lenses in front of right and left eyes of a user; and at least one elongated slit provided on said frame extending horizontally over the right and left spectacle lenses;

wherein said frame includes an elongated upper frame beam extending horizontally over said right and left spectacle lenses and said slit is formed by said elongated upper frame beam and an elongated beam like member provided on the frame beam, and said elongated beam-like member is secured to said elongated upper frame beam movably at least in an up and down direction so as to change a distance of the slit.

3. Spectacles for presbyopia comprising:

right and left spectacle lenses for correcting presbyopia;

a frame for supporting said right and left spectacle lenses;

right and left side pieces respectively pivoted to right and left sides of said frame for holding the right and left spectacle lenses in front of right and left eyes of a user; and at least one elongated slit provided on said frame extending horizontally over the right and left spectacle lenses;

wherein said frame includes an elongated upper frame beam extending horizontally over said right and left spectacle lenses and said slit is formed by said elongated upper frame beam and an elongated beam like member provided on the frame beam, and said elongated beam-like member is rotatably secured to said elongated upper frame beam at both ends thereof by means of hinges such that the elongated beam-like member is folded on a front surface of the elongated upper frame beam.

\* \* \* \* \*